United States Patent [19]

Beal

[11] 4,386,916
[45] Jun. 7, 1983

[54] MENTAL FUNCTIONS COMPLEXITY MODEL

[76] Inventor: George M. Beal, N-208 Regency Pl., Lawrence, Kans. 66044

[21] Appl. No.: 362,750

[22] Filed: Mar. 29, 1982

[51] Int. Cl.³ ............................................. G09B 23/30
[52] U.S. Cl. ..................................... 434/270; 40/444; 362/811
[58] Field of Search ................. 40/442, 444; 272/7 D, 272/7 P; 362/231, 806, 808, 809, 811; 434/98, 102, 145, 267, 270

[56] References Cited

U.S. PATENT DOCUMENTS

| | | | |
|---|---|---|---|
| 718,496 | 1/1903 | Meagher | 272/8 P X |
| 1,918,123 | 7/1933 | Newman | 272/8 P X |
| 2,359,559 | 10/1944 | Horky | 362/806 X |
| 3,271,879 | 9/1966 | Sackler | 434/270 |
| 3,538,323 | 11/1970 | Ziegler | 362/806 |
| 3,762,082 | 10/1973 | Mincy | 362/811 X |
| 3,789,211 | 1/1974 | Kramer | 362/231 |
| 3,885,797 | 5/1975 | Booty | 362/811 X |
| 3,949,350 | 4/1976 | Smith | 362/231 X |
| 4,285,673 | 8/1981 | Thomas | 434/98 |

*Primary Examiner*—Harland S. Skogquist
*Attorney, Agent, or Firm*—Schmidt, Johnson, Hovey & Williams

[57] ABSTRACT

A mental functions complexity model is provided that is suitable for demonstrating, in three-dimensional perspective, the interrelationships of the various mental functions performed by the human brain. The model preferably includes an opaque, upturned, hemispherical base fixedly supported by a saddle, a circular, rotatable, translucent, horizontal disc panel on top of and covering the base, a pair of intersecting, semi-circular, translucent, upright discs mounted in perpendicular relationship to one another above the horizontal disc and being rotatable independently of the horizontal panel, a central translucent light-diffusing hemispherical member centrally located in relation to the horizontal and upright discs, a plurality of independently variable light sources located within the base and below the horizontal disc, and motor drives located within the base for rotating the horizontal and vertical discs. The light sources within the base are advantageously focused towards the central, hemispherical member, and are independently controllable for varying light intensity, hue and value. In operation, the light and motor drives are operated in a predetermined sequence to demonstrate in tangible, three-dimensional form, the interrelationships of the human brain's abstract, functional characteristics.

15 Claims, 9 Drawing Figures

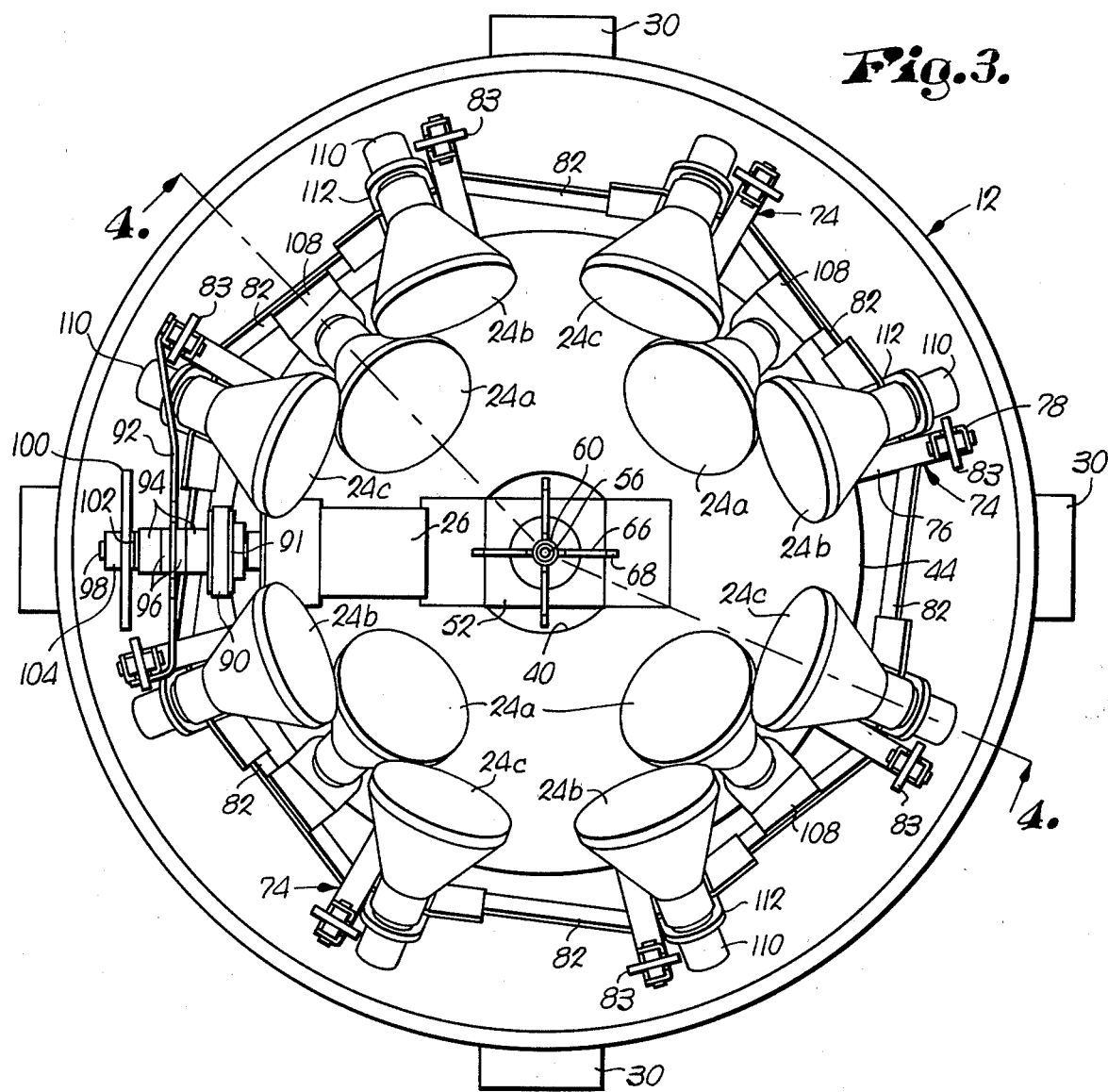
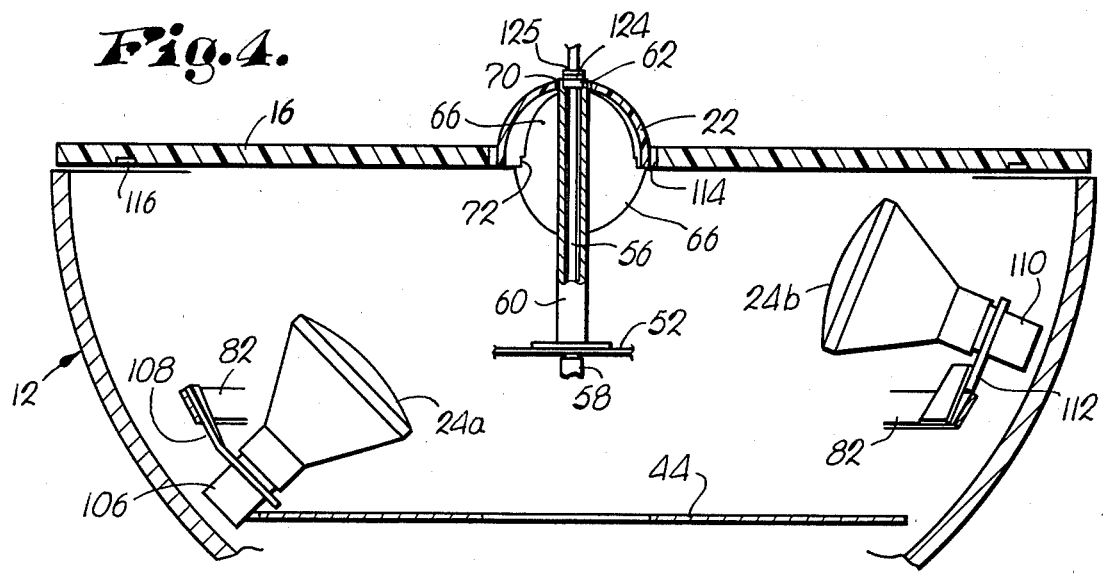

MENTAL FUNCTIONS COMPLEXITY MODEL

BACKGROUND OF THE INVENTION

1. Field of the Invention

This invention relates to a mental functions complexity model which is suitable for demonstrating in three-dimensional, tangible form, the interrelationships of the major divisions of the brain traditionally identified by anatomists and phychologists, and puts them into their relative positions for studying functions of the human brain. More particularly, it is concerned with a human functions complexity model having a hemispherical base, a stainless steel structural frame within the base, a plurality of independently controlled light sources mounted on the frame, a horizontal, circular, rotatable, translucent, synthetic resin disc which rides one quarter of an inch above and covers the open, upturned hemisphere, a pair of intersecting, perpendicular, semi-circular, translucent, interlocked upright synthetic resin discs, a central, translucent, hemispherical member centrally located in relationship to the horizontal and upright synthetic resins discs, and a pair of motor drives for rotating the panels.

2. Description of the Prior Art

Psychologists have long been concerned with the study of how the human brain actually functions, as opposed to the study of the anatomical characteristics of the brain. The functional analysis of the human brain necessarily deals with abstract concepts and principles that, for explanation and demonstration purposes, are categorized, separated, and reduced to sketches and other models. Heretofore, however, these models have been restricted to two-dimensional charts and descriptions, and therefore have been unable to adequately portray the interrelationships of each of the functional categories conceived by psychologists.

A mental functions complexity model that could portray the interrelationships of the mind's various functions in three-dimensional form would be a decided advantage in the study of psychology.

SUMMARY OF THE INVENTION

The problems outlined above are in large measure solved by the mental functions complexity model in accordance with the present invention. That is to say, the mental functions complexity model hereof is a three-dimensional model, and may be used, through the variation, mixing and presentation of a plurality of light sources, to effectively demonstrate the interrelationships of the abstract functions of the human brain.

The human functions complexity model in accordance with the present invention broadly includes a generally opaque, upturned, hemispherical base fixedly supported by a saddle stand, a circular, translucent, horizontal disc rotatably supported by and covering the base, two intersecting, perpendicular, translucent, semi-circular, upright discs mounted above the horizontal disc and rotatable independently of the horizontal panel, a stationary, translucent, hemispherical, light-diffusing member centrally located in relationship to the horizontal and upright discs, a plurality of light sources within the base independently variable in hue, intensity and value, and a pair of power drives for rotatably driving the horizontal and upright discs.

In particularly preferred forms, the horizontal and upright translucent discs are tinted to selected colors, and vary in color gradation from light at their center to a dark gradation at their perimeter. The usual light sources are red, green and blue electrical light bulbs. The light from the bulbs may be mixed to produce white light, or may be combined to provide a variety of light combinations. The light bulbs are directed towards the small, translucent, light-diffusing central member. The motor drives operate in the range of 2-4 rpm and are capable of driving the planes in either a clockwise or counterclockwise rotation.

BRIEF DESCRIPTION OF THE DRAWINGS

FIG. 3 is a sectional view taken along the line 3—3 of FIG. 2;

FIG. 4 is a sectional view taken along the line 4—4 of FIG. 3;

DESCRIPTION OF THE PREFERRED EMBODIMENT

Figure 1:
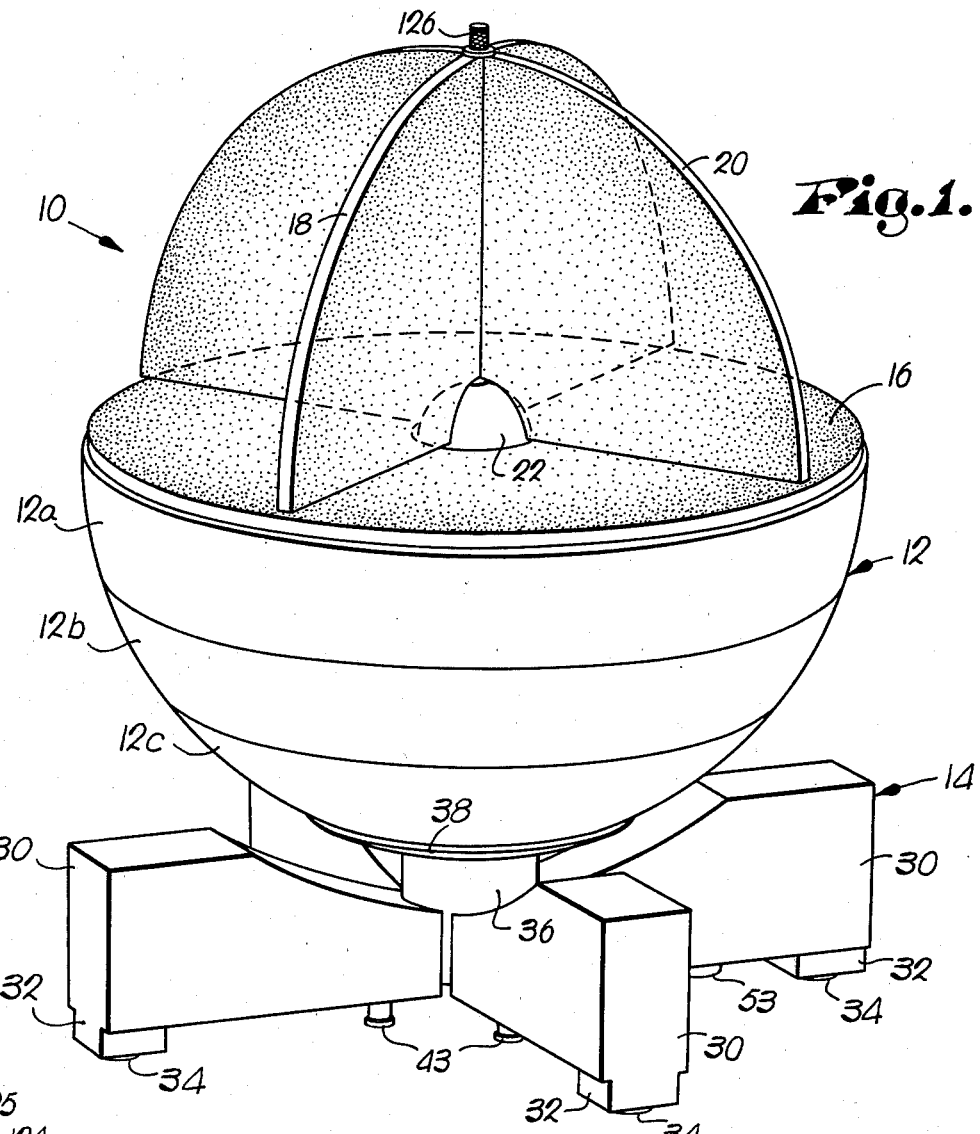
FIG. 1 is a perspective view of the mental functions complexity model in accordance with the present invention.

Referring to the drawings, the mental functions complexity model 10 in accordance with the present invention is depicted in a perspective view in FIG. 1 and broadly includes a generally opaque, upturned, hemispherical base 12 fixedly supported by a saddle stand 14, a circular, translucent, horizontal disc 16 rotatably supported by and covering the base 12, two intersecting, perpendicular, translucent, generally semi-circular, upright discs 18, 20, mounted above the horizontal disc 16, a stationary, translucent, downturned hemispherical or frusto-globular, light-diffusing member 22 centrally located relative to the horizontal and upright discs, a plurality of light sources as at 24 within the base and independently variable in hue, intensity and value, and a pair of power drives 26, 28 for rotatably driving the horizontal and upright discs 16, 18, 20.

In more detail, the saddle 14 includes four horizontally oriented, spaced apart supporting legs as at 30, each having a downward projecting member as at 32 that includes a floor-engaging caster as at 34. The legs 30 are aligned in perpendicular relationship. The legs 30 may be formed from plywood, and the sidewalls of each leg 30 form an internal cavity 35. Each leg 30 supports, and in turn is supported by, a formed stainless steel support member 37 which is notched into the wooden leg 30. The support members 37 are folded into rectangular form for strength, and are interposed between upper and lower stainless steel, cross-shaped, single pieces 39, 41. The support members 37 extend to the far, vertical, internal face of their respective legs 30. The vertical faces are notched to receive the support members 37. Adjustable, stainless steel casters 43 are received through the lower stainless steel support member 41 and are fixedly attached to the stainless steel support members 37. One leg 30 includes an electrical socket 51 and a sleeved aperture 53. An air cooling hose from a central panel fan (not shown) may be received through the sleeved aperture 53. An upright, metallic, support tube 36 is carried by cross plate member 39, and is positioned thereon by alignment members 55. An outwardly extending, metallic, concavo-convex fin 38 is welded to and encircles tube 36.

The hemispherical base 12 includes a lowermost aperture 40, through which the support tube 36 is received. The base may be constructed of a suitable synthetic resin, or plywood, or any other opaque material. Horizontal stripes or color bands 12a, b, c, are advantageously painted on the outer surface of the base.

Figure 2:
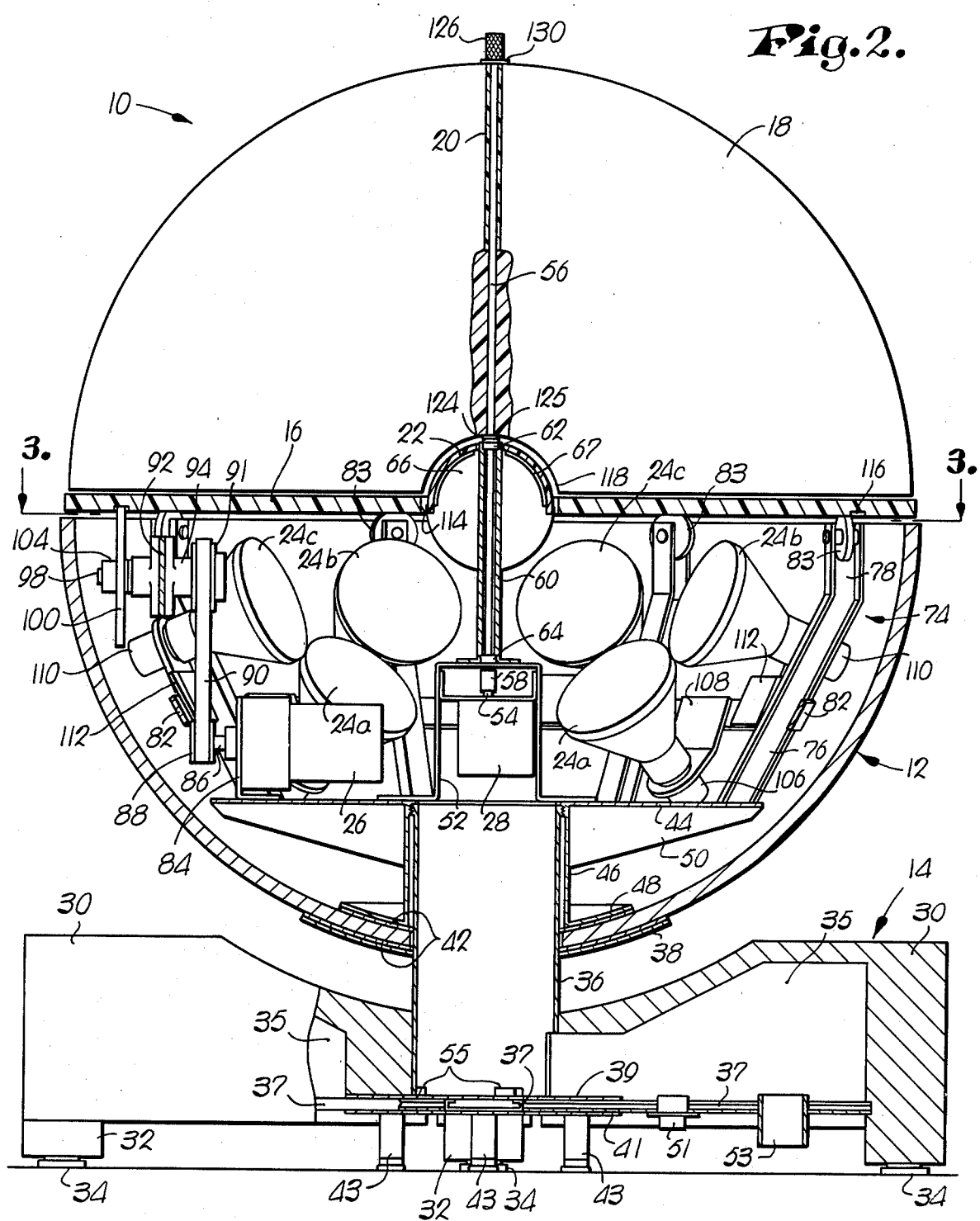
FIG. 2 is a fragmentary, vertical, sectional view of the mental functions complexity model in accordance with the present invention.
Figure 6:
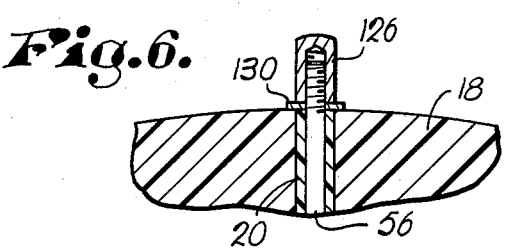
FIG. 6 is a fragmentary sectional view taken along the line 6—6 of FIG. 5.
Figure 5:
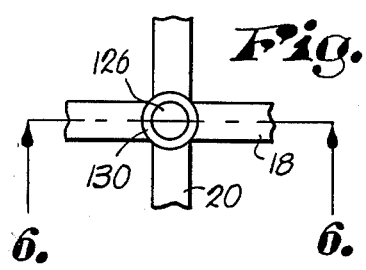
FIG. 5 is a fragmentary top view depicting the intersection of the upright semi-circular panels.

A horizontal, metallic, annular platform 44 is supported by the tube 36. The uppermost end of the tube 36 includes a threaded portion 45. Platform 44 is part of a fabricated unit that includes a tubular sleeve 46 that has an uppermost threaded portion 47 and a lowermost concave-convex annular flange 48, and a plurality of supporting ribs 50. The tubular sleeve 46 depends from the platform 44 and encircles the tube 36. The curves of flange 48 and fin 38 are complementary to the curve of the inner and outer surfaces of the hemispherical base 12, respectively. As best depicted in FIG. 2, the base 12 and a cushioning material 42 are interposed between the flange 48 and the fin 38, and the base 12 is fixedly mounted thereby.

A metallic, motor drive support stand 52 is centrally positioned on the annular platform 44. Power drive 28 is preferably in the form of a vertically oriented electric motor, and is secured to the support stand 52 by screws (not shown). The motor 28 preferably operates at about 2 rpm. The drive shaft 54 of motor 28 extends upwardly, and is connected to an elongated, rotatable, upright rod 56 by coupling 58. Rod 56 is received, at its lowermost portion, within a stationary, tubular sleeve 60 that is fixedly attached to and supported by support stand 52. Rod 56 is positioned within the sleeve 60 by thrust bearing 62 and nylon alignment bearing 64.

Figure 9:
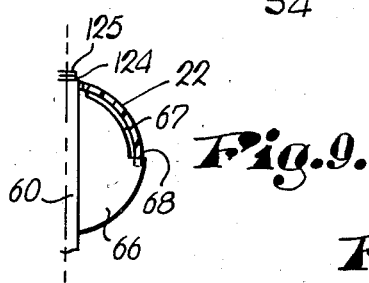
FIG. 9 is a fragmentary, sectional view of the downturned hemispherical light diffusing member and a supporting element therefor.
Figure 8:
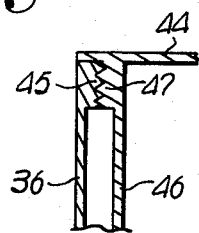
FIG. 8 is an enlarged, fragmentary, sectional view depicting the threaded coupling between the supporting tube and surrounding sleeve.

Four generally semi-circular, upright, reflective elements 66 are respectively fixedly attached to sleeve 60 in perpendicular relationship as best seen in FIG. 3. Referring to FIG. 9, it will be appreciated that the upper quadrant of each semi-circular element 66 has two smaller radii than the lower quadrant of the element, such that a horizontal support edge as at 68 is presented by each element 66 and a gap 67 is presented between the element 66 and light diffusing member 22. As best seen in FIG. 9, the central, translucent, downwardly opening, hemispherical member 22 includes a central aperture 70 that receives the sleeve 60 therethrough, and has four lowermost notches as at 72 for engaging the support edges 68 of semi-circular elements 66. The member 22 is advantageously formed from clear synthetic resin or glass material. The inner surface of the member 22 is lightly sandblasted to give the member 22 its translucent characteristics.

Eight upright, spaced apart, angled stanchions 74 are fixedly attached to and extend upwardly from the platform 44. The stanchions 74 include a lower diagonal portion 76 and an uppermost, vertical portion 78. The stanchions 74 are interconnected by horizontal support members 82 fixedly attached to the lowermost portions 76 of stanchions 74. Each stanchion 74 includes an uppermost, synthetic resin roller 83 rotatably carried by its uppermost portion 78.

Power drive 26 is connected to platform 44, in a horizontal orientation, by support stand 84. The power drive 26 is an electric motor and preferably operates at about 4 rpm. Drive shaft 86 extends outwardly from the motor drive 26 and is coupled to pulley 88. A belt 90 connects pulley 88 with a second, uppermost pulley 91.

A metallic supporting strap 92 is interconnected between the uppermost portions 78 of two stanchions 74. Two bearing couplings 94, each including a flange 96, are fixedly attached to the strap 92. A horizontally oriented pulley shaft 98 is received through and supported by couplings 94. Pulley 91 is drivingly secured to pulley shaft 98. A driving wheel 100, preferably formed of a hard elastomer material, is rotatably positioned on pulley shaft 98 by spacers 102, and is secured to shaft 98 by fitting 104.

Light sources 24 are preferably 150 watt flood lamps and may be of the type manufactured by General Electric Company and designated as GE 150 Watt Par 38 Red, Blue, and Green Dichro-Color Flood Lamps. As best seen in FIG. 3, there are twelve flood lamps 24 arranged in four sets of three lamps. Each set of three lamps 24 has a lower lamp 24a that is advantageously a Green Dichro-Color Flood Lamp, and two uppermost lamps 24b, 24c, one of which is a Red Dichro-Color Flood Lamp and the other being a Blue Dichro-Color Flood Lamp. As will be appreciated, the light from the three different colored lamps may be continued to form a white light. The lower lamps 24a are threadably received in porcelain sockets as at 106. Each socket 106 is connected to a horizontal support member 82 by a connecting piece 108. The upper lamps 24a, 24b are threadably received in porcelain sockets as at 110 which are similar to sockets 106. Each socket 110 is connected to a horizontal support member 82 by a connecting piece 112. As is depicted in FIGS. 2, 3 and 4, lamps 24 are all focused on a relatively restricted focal region that is generally coextensive with the region defined by the central hemispherical member 22 and the four semi-circular reflective elements 66. Each group of three flood lamps 24a, b, c is focused on a common point on rod 56, level with the center axis plane of horizontal disc 16.

The horizontal and vertical discs 16, 18, 20 are preferably formed from one half inch thick translucent synthetic resin material. The horizontal disc 16 is generally circular and has a central apeture 114 which receives the reflective elements 66 and hemispherical member 22. The lower surface of the horizontal disc 16 includes an annular groove 116. The drive wheel 100 is drivingly received within the groove 116.

Figure 7:
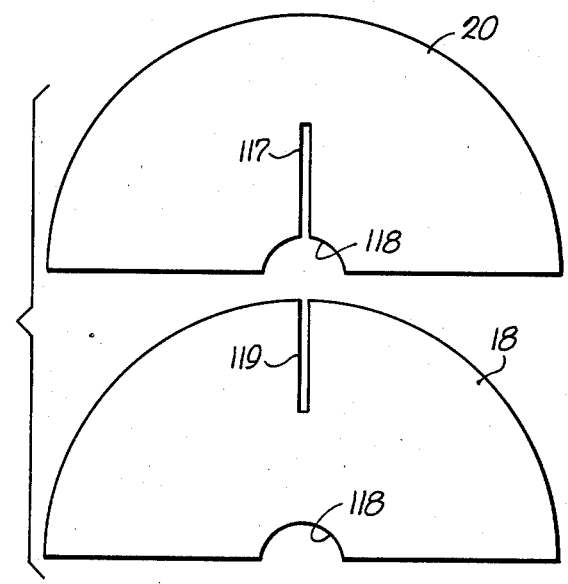
FIG. 7 is an elevational view of the upright discs.

The upright discs 18, 20 are likewise one half inch thick synthetic resin material. The panels 18, 20 are generally semi-circular and each include a generally semi-circular notch 118 which receives the reflective element 66 and the hemispherical central member 22. As best seen in FIG. 7, upright panel 18 includes a radially oriented notch 117 in its uppermost portion, and upright panel 20 includes a radially oriented notch 119 in its lowermost portion. The respective radial notches in panels 18 and 20 matingly engage to permit discs 18, 20 to fixedly engage each other. Each upright disc 18, 20 includes a continuous, bored-through channel through which rod 56 is received. Rod 56 includes a circumferential notch which receives a retainer ring 124. One or more spacing washers 125 may be carried above ring 124. A knurled cap-nut 126 is threadably received by rod 56, and is spaced apart from upright panels 18, 20 by washer 130.

The discs are advantageously permanently tinted to a selected color by adhesively securing a thin, colored film to the surface of the discs. The color of the film is preferably of a light gradation at the panels inner edges nearest the member 22. The gradation of the film's color increasingly darkens outwardly along the discs radii.

In operation, horizontal panel 16 is selectively rotated in either a clockwise or counterclockwise rotation by driving wheel 100. Upright discs 18, 20 are carried by rotatable rod 56 and may also be selectively rotated in a clockwise or counterclockwise rotation thereby.

Flood lamps 24 may be connected to a control panel (not shown) by electrical lines (not shown) that are lead through the center of the working platform 44, via support cylinder 36. The lights are independently variable and may be adjusted at the control panel to vary their intensity, hue and value. The red, blue and green light emitted from the flood lamps 24 is reflected, diffused and mixed by elements 66 and the central hemispherical translucent member 22, and may, when properly positioned, centered and balanced, present a white light at the hereinbefore described focal region. The white light, along with the colored light emitted from the lamps 24, is transmitted to the horizontal and vertical discs 16, 18, 20.

The rotatable discs and variable lights can arbitrarily be assigned various representations or values. For instance, the large hemisphere 12 can represent the unconscious functions of the human mind, and the discs 16, 18, 20 and central hemispherical member 22 can collectively be used to represent the conscious functions of the human mind. Advantageously, the central downturned hemispherical member 22 may represent intuition, the horizontal disc 16 may represent sensations, the upright disc 18 may represent reasoning functions, and upright disc 20 may represent feelings, values and/or emotions. The schematic separation of the various functions of the human mind by the various spatial orientations of the discs may be enhanced by applying a different colored film to the surface of the discs as hereinbefore described. For instance, the horizontal disc 16 may be tinted to a yellow color, upright disc 18 may be tinted to a blue color, and upright disc 20 may be tinted to a red color. The light sources 24 may be varied, and the discs 16, 18, 20 may be rotated, such that the spatial and color relationships of the mental functions complexity model 10 may give a number of variations that approaches infinite. The tangible interrelationships of the lights and rotatable discs can represent in perceivable schematic form, the abstract interrelationships of the human mind's various functions.

I claim:

1. A mental functions complexity model comprising: a plurality of individually variable, light-emitting sources focused on a single relatively restricted focal region; means proximal to said sources for receiving and diffusing light therefrom, including structure presenting a light-diffusing surface located substantially at said focal region, and at least one horizontally oriented disc and at least one vertically oriented disc, said discs being adjacent said surface-presenting structure; and means operatively supporting said sources and said light-receiving and diffusing means.

2. A mental functions complexity model as in claim 1, said supporting means including a light-reflecting member partially enclosed by and supporting said light-diffusing surface.

3. A mental functions complexity model as in claim 1, said light sources being variable in intensity, hue and value.

4. A mental functions complexity model as in claim 1, said horizontal disc being circular, and generally planar, and said light-receiving and diffusing means further including a second vertical disc adjacent said surface-presenting structure, and intersected by said first vertical disc, said vertical discs being semi-circular and generally planar.

5. A mental functions complexity model as in claim 4, said horizontal and vertical discs being permanently tinted to a selected color, and said color varying in gradation from light to dark in a continuum from said discs innermost edges to their outermost edges respectively.

6. A mental functions complexity model as in claim 4, said mounting means including a plurality of rollers operatively coupled to said horizontal disc for permitting rotation of the horizontal disc.

7. A mental functions complexity model as in claim 4, said supporting means including an elongated, axially rotatable rod, said vertical discs being fixedly interconnected to one another and mounted on said rod for rotation therewith.

8. A mental functions complexity model comprising:
    a plurality of individually variable light-emitting sources focused on a relatively restricted focal region;
    a generally circular, horizontally oriented, translucent disc above said sources;
    a pair of generally semi-circular, intersecting, upright translucent discs atop said horizontal disc;
    a frusto-globular, translucent member generally located proximal said focal region for receiving and diffusing light emitted from said light-emitting sources, and for transmitting said light to said discs; and
    a generally dish-shaped, substantially opaque base for operatively supporting said sources, said member and said panels.

9. A mental functions complexity model as in claim 8, said supporting means including a plurality of rollers operatively coupled to said horizontal disc for permitting rotation of this disc.

10. A mental functions complexity model as in claim 8, said supporting means including an elongated, axially rotatable rod, said vertical disc being fixedly interconnected to one another and mounted on said rod for rotation therewith.

11. A mental functions complexity model as in claim 8, said supporting means including light-reflecting member partially enclosed by and supporting said member.

12. A mental functions complexity model comprising:
    a plurality of individually variable, light-emitting sources focused on a single relatively restricted focal region;
    means proximal to said sources for receiving and diffusing light therefrom, including
        structure presenting a light-diffusing surface located substantially at said focal region;
        at least one circular, generally planar, and horizontally oriented disc; and
        a pair of intersecting, semi-circular, generally planar, vertically oriented discs, said discs being adjacent said surface-presenting structure; and means operatively supporting said sources and said light-receiving and diffusing means.

13. A mental functions complexity model as in claim 12, said horizontal and vertical discs being tinted to a selected color, and said color varying in gradation from light to dark in a continuum from said discs innermost edges to their outermost edges respectively.

14. A mental functions complexity model as in claim 12, said mounting means including a plurality of rollers operatively coupled to said horizontal disc for permitting rotation of the horizontal disc.

15. A mental functions complexity model as in claim 12, said supporting means including an elongated, axially rotatable rod, said vertical discs being fixedly interconnected to one another and mounted on said rod for rotation therewith.

* * * * *